(12) United States Patent
Nelson

(10) Patent No.: US 6,361,688 B1
(45) Date of Patent: Mar. 26, 2002

(54) TREATING A LIQUID WITH A GAS

(76) Inventor: William R. Nelson, 7910 NE. Day Rd. W., Bainbridge Island, WA (US) 98110

( * ) Notice: Subject to any disclaimer, the term of this patent is extended or adjusted under 35 U.S.C. 154(b) by 0 days.

(21) Appl. No.: 09/501,808

(22) Filed: Feb. 10, 2000

Related U.S. Application Data

(63) Continuation-in-part of application No. 09/071,249, filed on May 1, 1998, now Pat. No. 6,054,046, and a continuation-in-part of application No. 08/832,386, filed on Apr. 2, 1997, now Pat. No. 5,865,995.

(51) Int. Cl.7 .................................................. B01F 3/04
(52) U.S. Cl. ....................... 210/205; 210/123; 210/188; 210/194; 261/75
(58) Field of Search ................................ 210/123, 188, 210/194, 205, 218, 258; 261/75

(56) References Cited

U.S. PATENT DOCUMENTS 4,834,343 A * 5/1989 Boyes
5,382,358 A * 1/1995 Yeh
5,391,328 A * 2/1995 Ott et al.
5,403,473 A * 4/1995 Moorehead et al.
5,881,574 A * 3/1999 Petrich
6,238,912 B1 * 5/2001 Moore et al.

* cited by examiner

Primary Examiner—Betsey Morrison Hoey
(74) Attorney, Agent, or Firm—Delbert J. Barnard

(57) ABSTRACT

An inner housing (38) is positioned within an outer housing (36). An gas/liquid mixture is caused to flow along a helical path upwardly through an outer chamber (70) that is formed by and between sidewalls (56, 64) of the outer and inner housings (36, 38). The gas/liquid mixture flows through a passageway (74) between a top end wall (62) and an upper end edge (66), from outer chamber (70) into an inner chamber (72). Residual gas is removed from the gas/liquid mixture by a gas-vent device that projects from top end wall (62) downwardly into the inner chamber (72). Liquid in the inner chamber (72) flows downwardly through an outlet opening (54) into an outlet conduit (44). The outlet conduit (44) has an effluent branch that removes liquid from the apparatus. It also includes a second branch conduit that delivers some of the liquid to the inlet of a re-circulating pump (34). The re-circulating pump (34) pumps the re-circulated liquid back into the lower end of the outer chamber (70). New gas and new untreated liquid is added to the re-circulated liquid before it is introduced into chamber (70). The re-circulated liquid, the new gas and the untreated liquid are admixed into a conduit and are then introduced into the lower end portion of the outer chamber (70) as an upward swirling helical current.

24 Claims, 7 Drawing Sheets

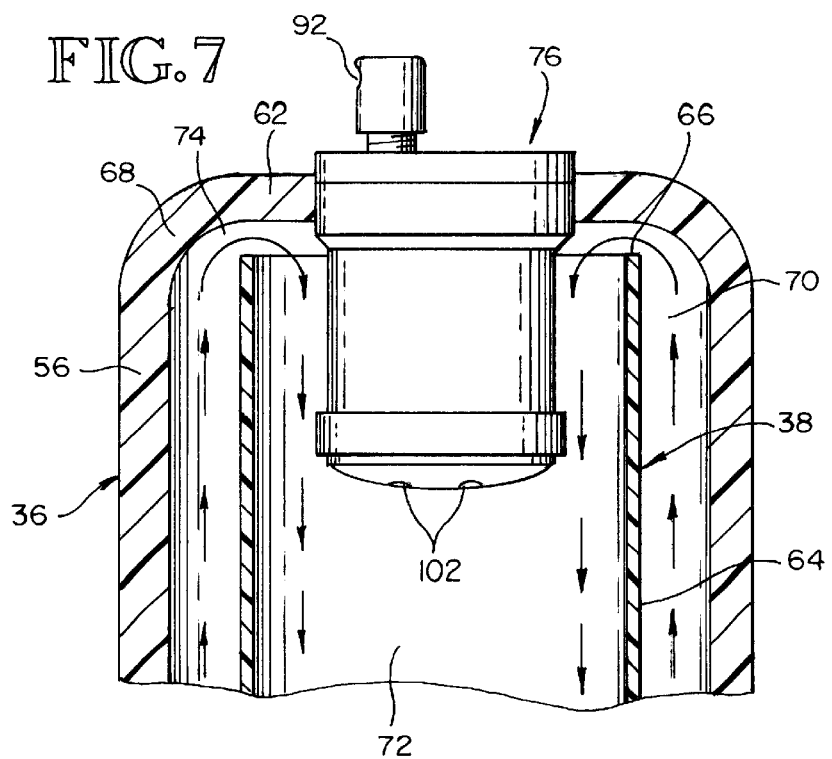
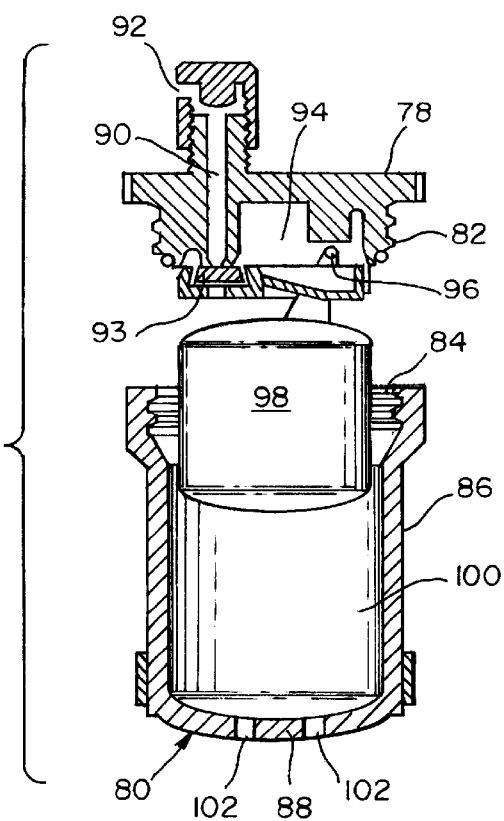

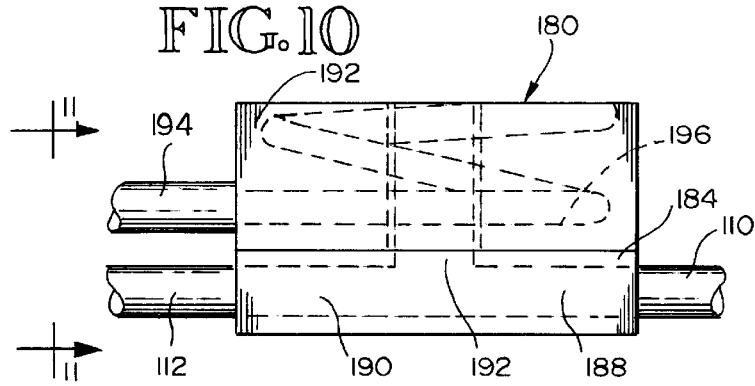
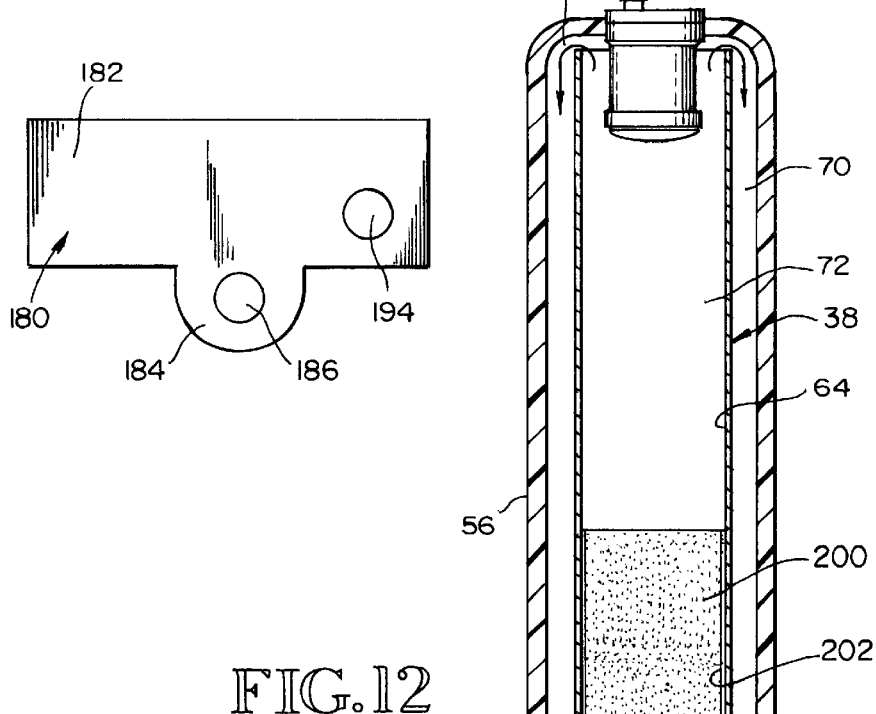
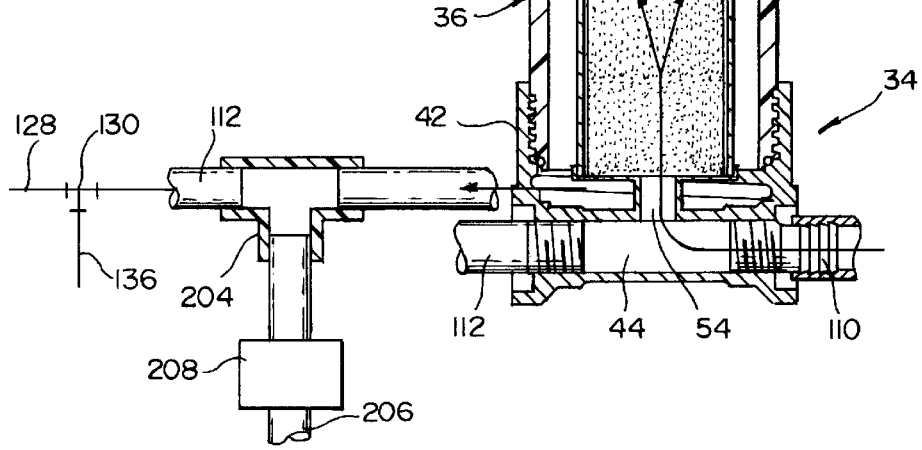

TREATING A LIQUID WITH A GAS

RELATED U.S. APPLICATION DATA

This application is filed as a continuation-in-part of my U.S. application Ser. No. 09/071,249, filed May 1, 1998, entitled System For Re-Circulating A Gas Mixture To Treat Liquids, now U.S. Pat. No. 6,054,046, granted Apr. 25, 2000, and a continuation-in-part of my earlier application Ser. No. 08/832,386, filed Apr. 2, 1997, entitled System For Treating Liquids With A Gas, and now U.S. Pat. No. 5,865,995, granted Feb. 2, 1999.

TECHNICAL FIELD

This invention relates to systems for first combining a gas, such as ozone, with a liquid, such as water, for treating the liquid with the gas, and then removing residual gas from the liquid prior to using the liquid.

BACKGROUND OF THE INVENTION

The Background of the Invention in my U.S. Pat. No. 5,865,995, granted Feb. 2, 1999, and entitled System For Treating Liquids With A Gas, and in my U.S. patent application Ser. No. 08/071,249, entitled System For Re-circulating A Gas Mixture To Treat Liquids, now U.S. Pat. No. 6,054,046, granted Apr. 25, 2000 are hereby incorporated into this Background of the Invention.

In the systems of my prior patents, a gas, such as ozone, is introduced into a liquid, such as water, and the gas/liquid mixture is caused to flow downwardly as a helical current through an outer chamber of a contact tank, to a lower end of the contact tank, and then back up through a center tube that extends upwardly from a lower region of the contact tank to an outlet conduit at the upper end of the contact tank. In the system of U.S. Pat. No. 5,865,995, the gas is introduced into a stream of untreated liquid and then the mixture is introduced into the contact tank. In the system of my second patent, some of a gas/liquid mixture in the contact tank is re-circulated and new gas is introduced into the re-circulated mixture. Also, new untreated liquid is introduced by itself into the upper end of the contact tank.

An object of the present invention is to improve on the prior systems for the purpose of more efficiently mixing the gas and liquids and more efficiently removing the residual gas following the treatment.

Another object of the present invention is to provide an apparatus for treating liquid with a gas that is relatively small for its capacity, is simple in its construction and is composed of parts that are relatively easy to assemble and disassemble.

BRIEF SUMMARY OF THE INVENTION

The apparatus of the present invention is for treating a liquid with a gas. It is basically characterized by a vertical outer housing having a sidewall, a top end wall and a bottom end wall, and a vertical inner housing within the outer housing, having a sidewall, a bottom wall and an open top spaced downwardly from the top wall of the outer housing. An outer chamber is formed by and between the sidewalls of the inner and outer housings when they are assembled. An inner chamber is formed within the inner housing. A transfer passageway leads from the upper end of the outer chamber into the upper end of the inner chamber. This transfer passageway is formed by and between the top wall of the outer housing and an upper end portion of the sidewall of the inner housing.

According to an aspect of the invention, a gas/liquid mixture is introduced into a lower portion of the outer chamber in such a way that it forms an upwardly flowing helical current in the outer chamber. A gas removal outlet is provided in the inner chamber, radially inwardly of and axially below the passageway at the top of the inner housing that connects the outer chamber with the inner chamber. A liquid outlet conduit is provided below the bottom wall of the inner housing. An outlet in the bottom wall of the inner housing connects the lower end of with the inner chamber to the outlet conduit.

According to another aspect of the invention, the outer housing has an upper portion that includes the top wall and at least a major portion of the sidewall of the outer housing. It also includes a lower portion that includes the bottom end wall of the outer housing. The upper and lower portions of the outer housing are detachably connected together.

According to a further aspect of the invention, the lower portion of the outer housing is formed to include an inlet chamber. The gas/liquid inlet conduit is directed to discharge at a tangent into the inlet chamber. The lower portion of the outer housing may also include the outlet conduit.

According to yet another aspect of the invention, the upper portion of the outer housing includes a first, major portion of the sidewall of the outer housing. The lower portion of the outer housing includes a second, minor portion of the sidewall of the outer housing. A screw connection is provided for detachably connecting the upper and lower sidewall portions of the outer housing.

According to another aspect of the invention, the outlet conduit includes an effluent branch leading away from the apparatus and a re-circulating branch. The apparatus further includes a re-circulating pump having an inlet and an outlet. A conduit connects the re-circulated branch of the outlet conduit with the inlet of the re-circulating pump. Another conduit connects the outlet of the re-circulating pump with a gas and liquid mixing region.

Preferably, a new gas delivery conduit leads into the conduit that extends from the outlet of the pump to the gas and liquid mixing region, for introducing new gas into the re-circulated mixture. Preferably also, an untreated liquid conduit leads to the gas and liquid mixing region. As a result, re-circulated gas/liquid mixture, new gas and untreated liquid are all combined in the gas and liquid mixing region to form a gas/liquid mixture that is then delivered through the gas/liquid inlet conduit into a lower portion of the outer chamber.

In preferred form, an ejector is provided in the re-circulated gas/liquid conduit. Flow of the re-circulated gas/liquid mixture through the ejector draws in some new gas that is added to and is mixed with the re-circulated gas/liquid flow.

In preferred form, a conduit is provided for delivering untreated liquid to the gas and liquid mixing region. As a result, re-circulated gas/liquid mixture, new gas and untreated liquid are all admixed together in the gas/liquid mixing region, to form a mixture that is delivered into the gas/liquid inlet conduit leading into the base of the outer chamber.

According to a still further aspect of the invention, a gas-vent housing is connected to the top end wall of the outer housing. This gas-vent housing extends downwardly from the top end wall into the inner chamber. The gas-vent housing has a sidewall that is spaced radially inwardly from an upper portion of the sidewall of the inner housing. It also has a bottom wall and the gas removal outlet includes one or more openings in this bottom wall. Preferably, the gas-vent housing includes a passageway leading from the one or more openings in its bottom wall, up through the gas-vent housing, and on out through an exhaust opening. The gas-vent housing is provided with a float controlled valve in this passageway which is normally open but is adapted to be closed by the float in response to liquid from the inner chamber rising in the gas-vent housing to a predetermined level. The rising liquid lifts the float and closes a valve in the gas-vent passageway.

The present invention may further includes positioning a filter in the housing for filtering the liquid as it flows through the inner housing to the outlet and the outlet conduit. Preferably, a back wash conduit is provided for leading back wash liquid into the outlet conduit and then through the outlet in the bottom wall of the inner housing. A back wash liquid discharge conduit is connected to the gas/liquid inlet conduit. This discharge conduit is provided with a valve that is normally closed but is opened when a back wash is being performed.

According to an aspect of the invention flow through the outer chamber may be in an downward direction and reverse flow through the inner chamber may be in an upward direction, through a filter medium, and residual gas may be removed from the top of the apparatus and the treated liquid may be removed from the top of the apparatus.

The present invention increases both gas exposure to the liquid and contact time between the liquid and the treatment gas and provides efficient gas removal from the liquid after the treatment. Many other advantages and attributes of the invention will be apparent from the following description of the inventor's best mode for carrying out the invention, and from the claims and from the various figures of the drawing, all of which provide a disclosure of the principles that make up the present invention.

BRIEF DESCRIPTION OF THE SEVERAL VIEWS OF THE DRAWING

Like reference numerals are used to indicate like parts throughout the several figures of the drawing, and:

FIG. 7 is a fragmentary longitudinal sectional view through the upper portion of the gas/liquid mixing and gas removal portion of the assembly, such view including arrows showing the flow path of the liquid in the device;

FIG. 8 is an exploded longitudinal sectional view of a float controlled gas release mechanism that is at the top of the gas/liquid mixing and gas removal device, with its control float being shown in side elevation;

FIG. 10 is a side elevational view of a base fitting for the vertical cylindrical housing that is shown in FIGS. 1, 2, 5–7 and 12;

FIG. 11 is an elevational view of the base fitting shown by FIG. 10, taken substantially from the aspect of line 11—11 in FIG. 10;

FIG. 12 is a full height longitudinal sectional view of the gas/liquid mixing and gas removal device shown by FIGS. 1, 2 and 5–7, further showing a charcoal filter canister within the inner housing of the device and showing a discharge conduit that is used when the filter is back washed, and showing a valve in the conduit;

DETAILED DESCRIPTION OF THE INVENTION

Figure 1:
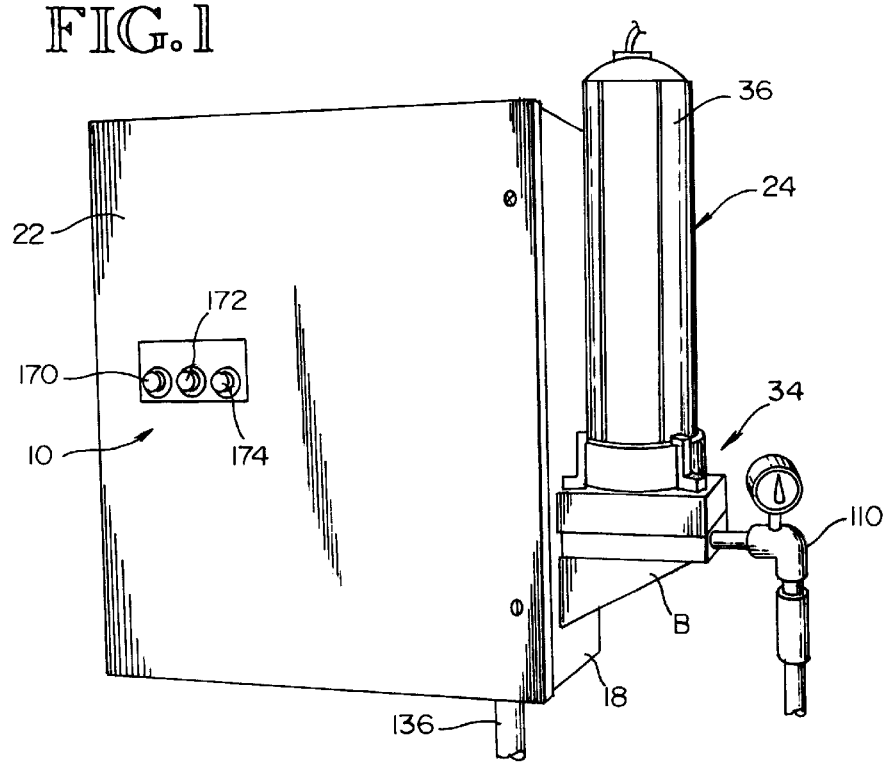
FIG. 1 is a pictorial view of a wall mounted liquid treatment system of the present invention, such view looking towards the front and one side of a system housing.

FIGS. 1–9 illustrate a wall mounted embodiment of the invention. It comprises a wall mounted cabinet 10 having top, bottom, side and back walls 12, 14, 16, 18, 20 and a removable front wall 22 that may be in the form of a door that is hinge connected along one side, to sidewall 16. FIG. 1 shows a mounting bracket B on sidewall 18. Bracket B mounts a contact tank 24 in which a liquid, such as water, is treated, e.g. by ozone.

Figure 2:
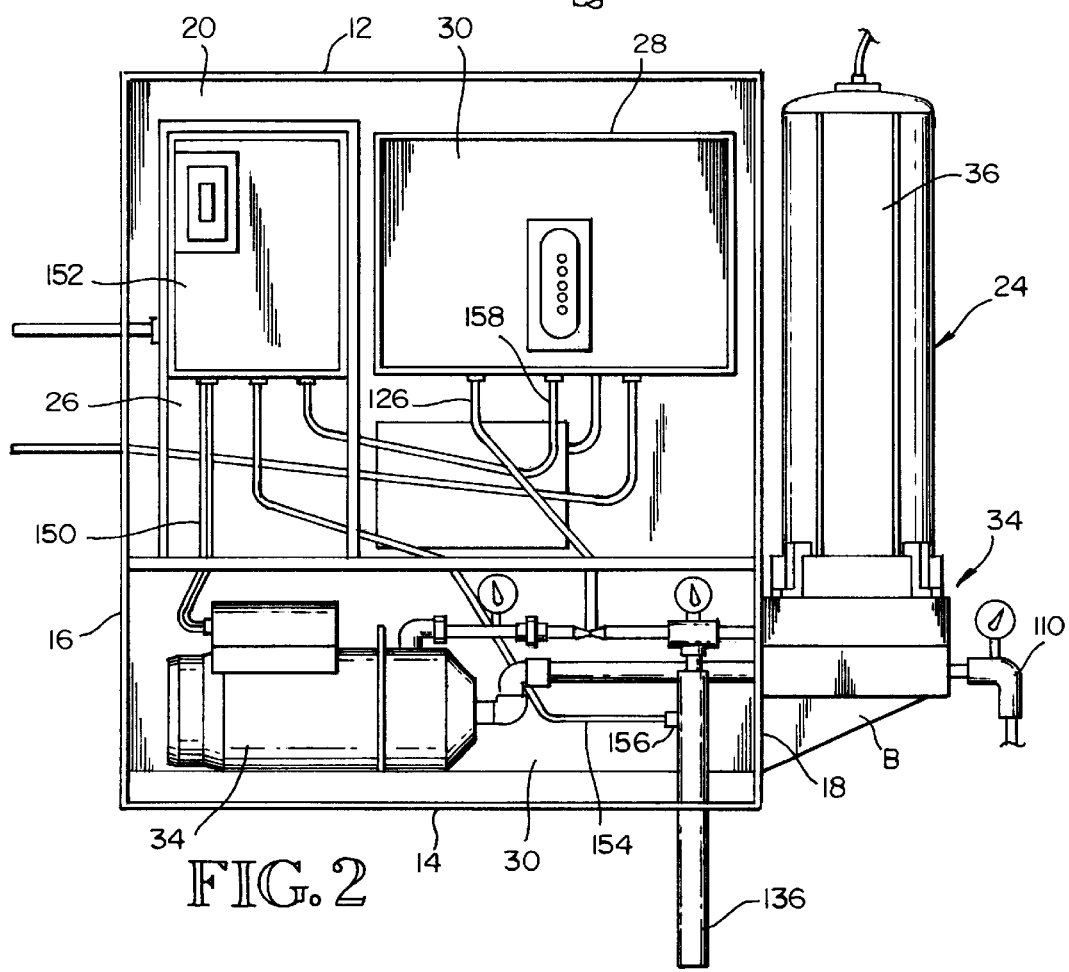
FIG. 2 is a front elevational view of the system shown in FIG. 1, but with the front panel of a housing removed in order to show components of a system that are within the housing.

FIG. 2 shows the system of FIG. 1 with the front wall or door 22 removed. Inside the cabinet 10 there is an electrical equipment compartment 26 in which electrical control circuitry and components are housed. Next to the electrical compartment 26 there is a gas source compartment 28 in which a gas source, e.g. an ozone generator 30, is situated. The ozone generator 30, when used, may be an existing ozone generator or may be a yet to be developed ozone generator. If the system is used with some gas other than ozone, the ozone generator will be replaced by a source of whatever gas is used. Herein, the component 30 will be sometimes referred to as a gas source 30 and at other times will be referred to as an ozone generator 30.

Figure 3:
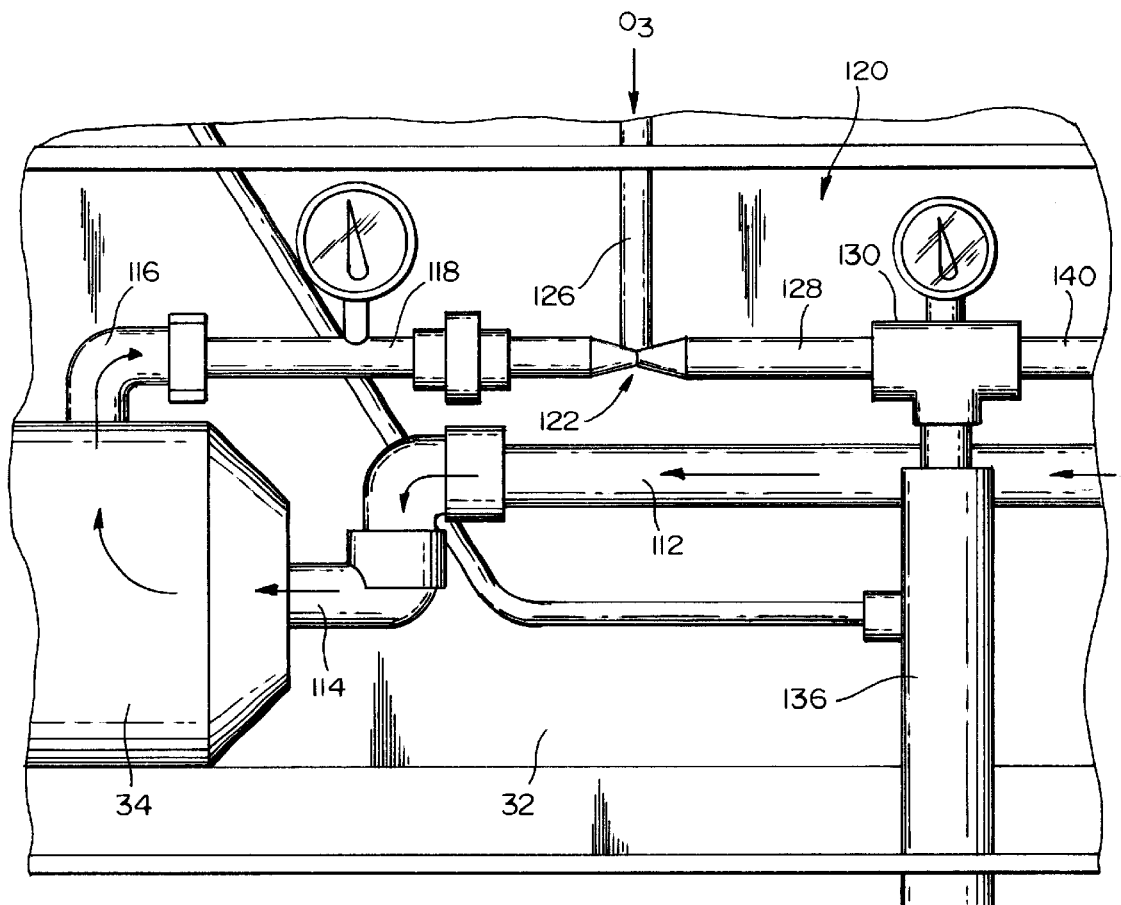
FIG. 3 is an enlarged scale fragmentary view of a lower portion of FIG. 2.

In cabinet 10, below the electrical compartment 26 and the gas source compartments 26, 28, there is a lower compartment 32 which houses a re-circulating pump 34 and several conduits that will hereinafter be described with specific reference to FIGS. 3 and 4.

The contact tank 24 has a base 34 that is mounted onto the mounting bracket B and outer housing 36. It also includes an outer housing 36 and an inner housing 38 (FIGS. 6, 7, 9 and 12).

Figure 5:
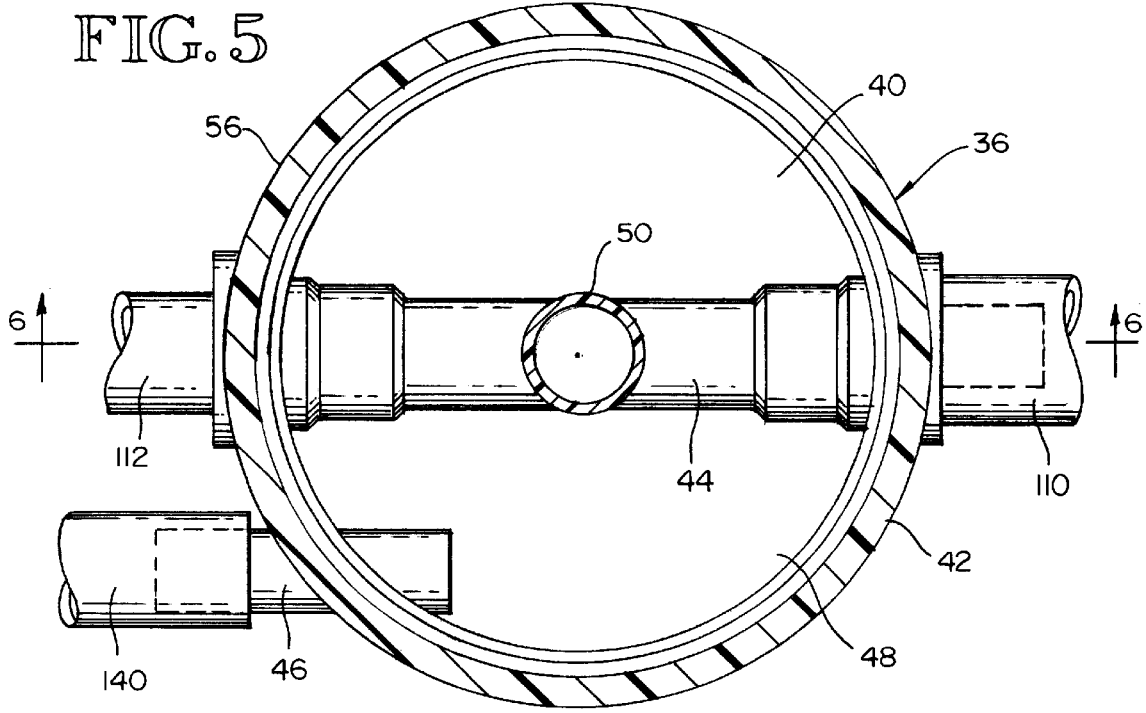
FIG. 5 is a transverse sectional view taken substantially along line 5—5 of FIG. 6.
Figure 6:
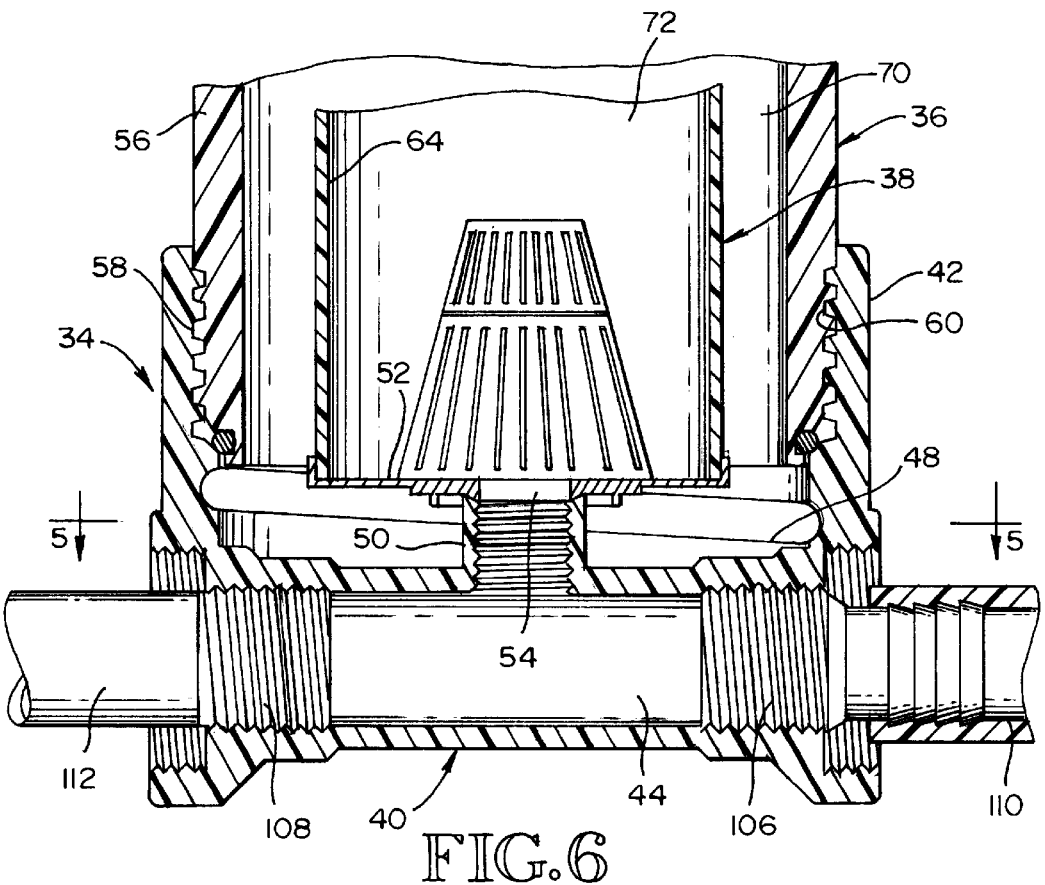
FIG. 6 is a longitudinal sectional view taken substantially along line 6—6 of FIG. 5.

Referring to FIGS. 5 and 6, the base structure 34 may comprise a bottom wall 40 and an upstanding sidewall 42. As will hereinafter be described, the bottom 40 may include an outlet conduit 44 that is built into the bottom 40. An inlet tube 46 extends through the base sidewall 42 generally at a tangent to a base chamber 48. FIG. 5 shows a top plan view of bottom wall 40 and outlet conduit 44. Tube 46, outlet conduit 44, base bottom wall 40 and base sidewall 34 are all made from plastic. The walls 40, 42 and the outlet conduit 44 may be injection molded as one piece and the tube 46 may be added. Or, tube 46 may also be injection molded together with walls 40, 42 and conduit 44.

Referring to FIG. 6, in preferred form, the outlet conduit 44 includes an upwardly projecting stem conduit 50 that is connected to a wall 52 that forms a bottom wall 52 for the inner housing 38. Bottom wall 52 includes an outlet opening 54 that is at the upper end of stem conduit 50.

Outer housing 36 includes a sidewall 56 that may be externally threaded at its lower end at 58. In that case, the lower sidewall 42 is provided with matching internal threads 60 so that the upper body portion of the outer housing 36 can be thread connected to the base portion 34 of the outer housing. The mating threads 58, 60 provide a convenient way of detachably connecting the upper body portion of the outer housing 36 to the base housing 34. As clearly shown by FIGS. 7, 9 and 12, the outer housing 36 also includes a top wall 62. Thus, in the illustrated embodiment, the outer housing 36 includes a top end wall 62, a bottom end wall 40 and a two part sidewall 42, 56.

The inner housing 38 comprises a bottom wall 52, a tubular sidewall 64 and an open top (FIG. 7 and 9) defined by an upper end-edge 66 at the upper end of the tubular sidewall 64. A rounded transitional wall 68 curves from where it is a part of sidewall 56 to where it is a part of top end wall 62. The inner surface of transition wall 68 is of concave curvature, as clearly shown in FIGS. 7 and 9. Sidewall 64 of inner housing 38 is spaced radially inwardly from sidewall 56 of outer housing 36. In the illustrated embodiment, the sidewalls 56, 64 are both cylindrical in shape. As a result, an annular space or chamber 70 is defined by and between the two sidewalls 56, 64. Herein, the space or chamber 70 will be referred to as the outer chamber 70. An inner chamber 72 is defined by and within the inner housing 38. As clearly shown by FIGS. 7 and 9, a transfer passageway 76 is formed between top end wall 62 of outer housing 36 and the end-edge surface 62 at the top end of the sidewall 64 of inner housing 38. In the illustrated embodiment, this passageway 74 is annular in shape. Also, by design, it has a cross sectional area that is smaller than the cross sectional area of the outer chamber 70.

By way of typical and therefore non limitive example, a wall mounted unit may measure approximately twenty inches from the floor of the outer chamber 70 (the top of bottom end wall 40) up to the top of the outer housing (the lower surface of the top end wall 62). The sidewall 56 of the outer housing may have an inside diameter of about 5.2 inches. The sidewall 64 of the inner housing 38 may have an outside diameter of about 4.5 inches and an inside diameter of about 4.3 inches. In this example, the outer chamber 70 has a radial dimension of approximately 0.35 inches and a cross sectional area of approximately 5.34 square inches. Inner chamber 72 has a cross sectional area of about 14.5 square inches. Thus, the cross sectional area of the inner chamber 72 is about 2.72 times the cross sectional area of the outer chamber 70. This is close to a 3:1 ratio of the inner chamber area to the outer chamber area. The transfer passageway 76 is approximately ⅛ inch high and has a circumference of about 14.13 inches. Thus, the area of passageway 76 is approximately 1.77 square inches. Accordingly, there is a substantial velocity increase of the flowing fluid as it flows from the outer chamber 70 through the transfer passageway 76. There is also turbulence at the exit of passageway 17 where the fluid makes an abrupt change in direction and then moves downwardly.

Figure 9:
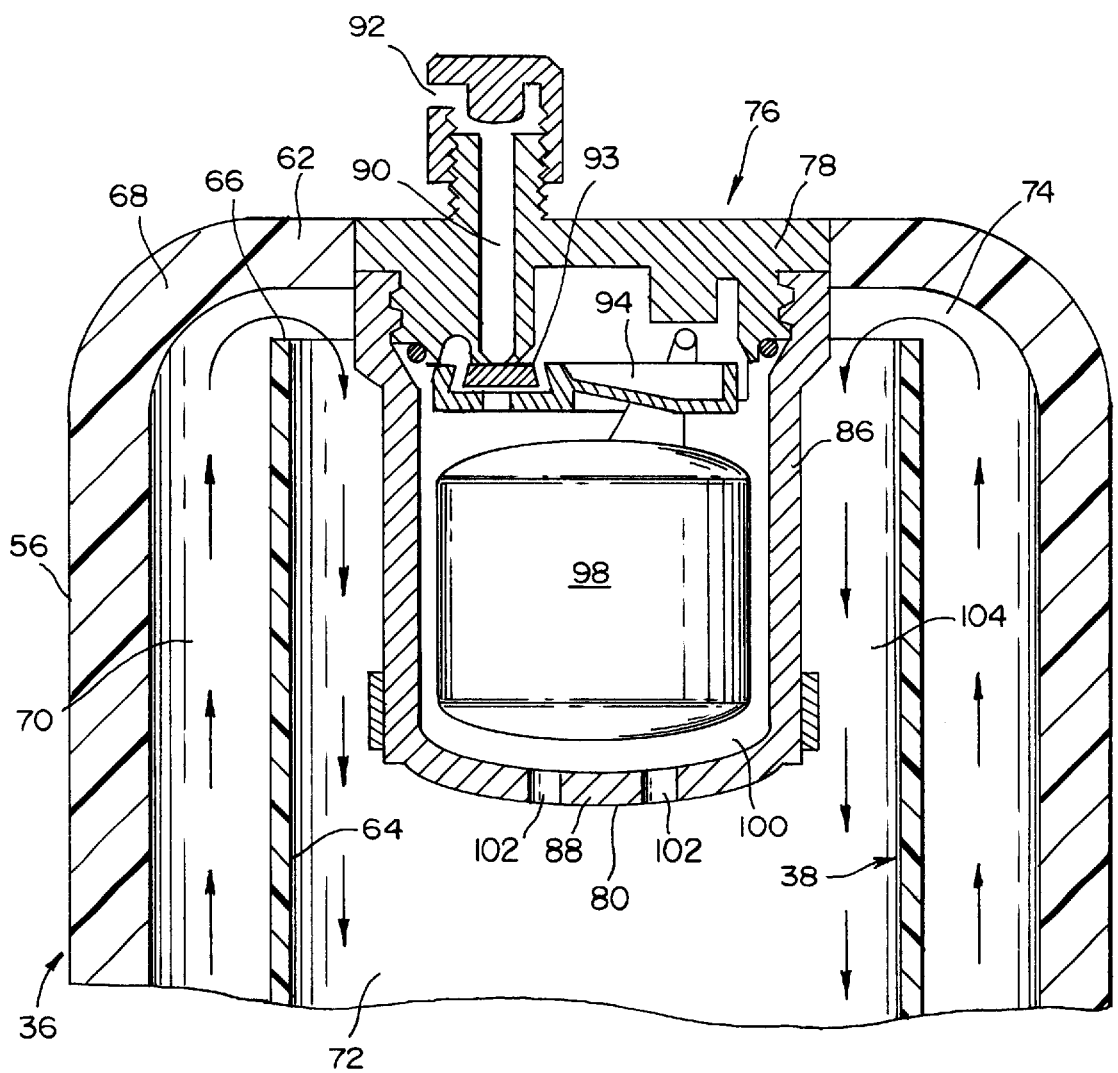
FIG. 9 is an enlarged scale view like FIG. 7, but showing the float controlled gas release mechanism in section except for the float that is shown in side elevation.

As best shown by FIGS. 7 and 9, top end wall 62 mounts a gas vent assembly 76. It includes a top section 78 that is connectable to the top end wall 62, and a lower section 80 in the nature of a housing that is removably connectable to the top section 78. For example, the top section 78 may include an externally threaded tubular wall 82 that is adapted to mate with internal threads 84 in an open upper end portion of lower section 80. Lower section 80 is shown to have a cylindrical sidewall 86 and a rounded lower end wall 88. A vent passageway 90 is formed in the upper section 68. The upper end of passageway 90 vents with atmosphere at 92. The lower end of vent 90 confronts a valve plug 92 that is at one end of a support arm 94. Support arm 94 is pivotally connected at 96 to a portion of the upper section 78. A float body 98 depends from the arm 74. FIG. 9 shows the gas vent 76 assembled. As illustrated, float body 98 is within a float chamber 100 within the lower section 80. When no liquid is within chamber 100, the weight of the float body 98 rotates the support arm 94 downwardly so as to move the valve plug 92 away from the lower end of vent passageway 90. The lower wall 88 of lower section 80 includes vent openings 102. Normally, the float body 98 holds the valve plug 92 open. Venting gas can flow from the inner chamber 72 upwardly through openings 102 and then through chamber 100 and into the lower end of vent tube 90 and then through vent tube 90 and out through the exhaust opening 92. If liquid should enter into the chamber 100 in an amount sufficient to float the float body 98 upwardly until valve plug 92 contacts the lower end of vent passageway 90, the vent passageway 90 becomes closed by the valve plug 92. This prevents liquid from flowing up and outwardly through the passageway 90.

The gas vent housing 86, 88 provides a second function. An annular passageway 104 is formed by and between sidewall 64 of inner housing 38 and sidewall 86 of the gas vent housing 86, 88. The function of this passageway 104 will be described in some detail below.

Referring now to FIGS. 5 and 6, in the preferred embodiment the outlet conduit 44 has two branches, an effluent branch 106 and a re-circulation branch 108. Effluent branch 106 delivers treated liquid out from the system via a delivery conduit 108 that takes it to a point of utilization or to a station where it is placed into storage containers. The re-circulation branch 108 is connected to a re-circulation conduit 112 that delivers re-circulated liquid to the inlet 114 of the aforementioned re-circulation pump 34. The outlet 116 for the re-circulation pump 34 is connected to a delivery conduit 118 that leads to a mixing region 120. Within the mixing region 120, the conduit 118 includes an ejector 122 having a venturi 124 that is connected to a gas delivery pipe 126. Referring to FIG. 2, the gas delivery pipe 126 leads downwardly from the gas source 30 which may be an ozone generator. The out flow branch 128 from the ejector 122 leads to a mixing Tee 130. As shown by FIG. 4, it is connected to a first inlet branch 132. A second inlet branch 134 is connected to a conduit 136 that delivers untreated liquid to the Tee mixing 130. An outlet branch 138 is connected to conduit 140 that leads to the inlet 46 for the base chamber 48.

Referring to FIG. 2, electric wiring 150 extends from the electrical control module 152 down to a connection with the re-circulating pump 34. Electrical wiring 154 extends from the electrical control module 152 to a flow on switch 156 in the conduit 136. Electrical wiring 158 extends from the electrical control module 152 to the gas source 30. The conduits 110, 118 and the mixing Tee 130 are shown to include pressure gauges for monitoring purposes. In the illustrated embodiment, an on/off power control 170 is provided on the housing door or cover 22. Next to it are two lights. Light 172 goes on when the power is on. Light 174 goes on when gas is being delivered from the gas source 30 to the ejector 122.

Figure 4:
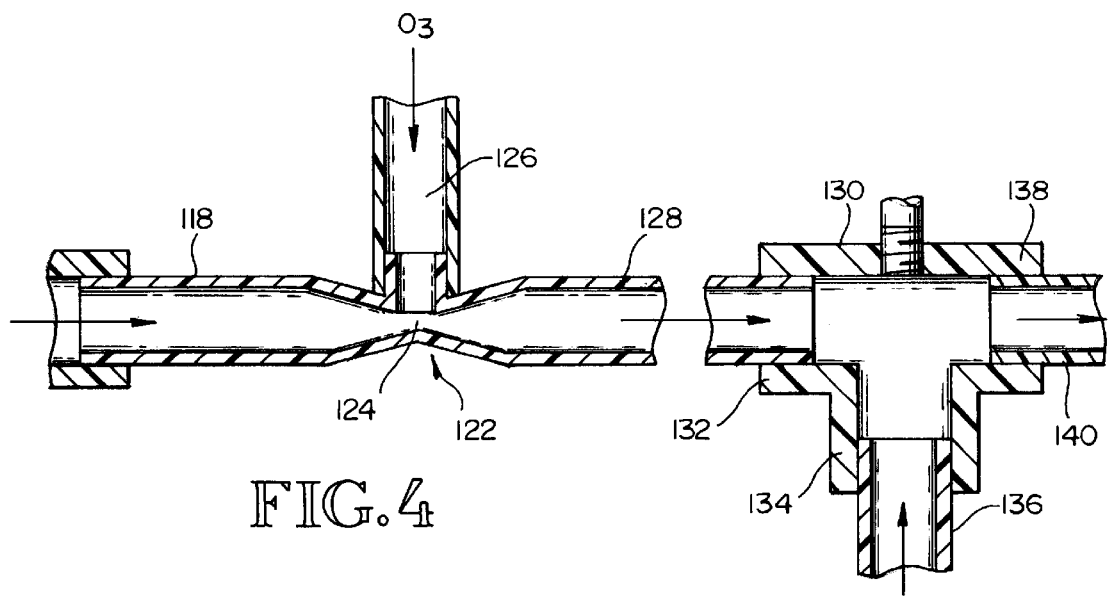
FIG. 4 is an enlarged scale fragmentary sectional view of a mixing region and a venturi-type ejector that is shown in FIGS. 2 and 3.

Referring to FIG. 4, re-circulated fluid flows through conduit 118 into the venturi section 124 of the ejector 122.

There, it draws in new gas from the gas supply conduit 126. The new gas and the re-circulated fluid then flow onto the mixing Tee 130. Within the mixing Tee 130, untreated liquid from conduit 136 is admixed with the gas and liquid from conduit 128. The new mixture flows through conduit 140 into the inlet 46 of the vortex generator. The gas appears as small bubbles in the liquid. As previously explained, the vortex generator causes the fluid to enter into the lower region of the outer chamber 70 and form an upwardly directed helical current in this chamber. The swirling of the liquid and the gas in the chamber 70 promotes their mixture.

Referring now to FIG. 9, when the fluid mixture reaches the top of chamber 70, it flows through the passageway 74 and into the inner chamber 72. Flow through passageway 74 is at an increased velocity because the cross sectional area of passageway 74 is smaller than the cross sectional area of outer chamber 70. By way of typical example, the passageway 74 may measure as small as 1/16th of an inch between the upper end edge 66 and the closest portion of top end wall 62. The concave inner surface of the transition wall 68 changes the direction of flow into a radially inward direction. The flow contacts the housing 86, 88 and is forced to again change direction. This time it flows downwardly through annular passageway 104 into the main part of inner chamber 72 below the housing 86, 88. There is an increase in turbulence where flow from passageway 74 enters into the passageway 104.

There is a somewhat violent swirling action of the fluids within the passageways 74 and 104 and below the housing 86, 88. The downwardly swirling mixture sucks down with it the gas bubbles that are in the liquid. Below the housing 86, 88, the small bubbles combine to form large bubbles and then these large bubbles move up out through the gas vent passageway 102, 100, 90, 92. It has been observed that the contact tank promotes swirling currents that in turn promote good gas and liquid mixing. It is also been observed that the small bubbles combine into large bubbles and leave the mixture through the vent passageway 102, 100, 90, 92.

Owing to an upward flow direction in the outer chamber 70 and a downward flow direction in the inner chamber 72, the outflow of liquid through the bottom of the inner chamber 72 is assisted by gravity. The column of fluid within chamber 72 is pulled by gravity down towards the bottom wall 52 and the outlet opening 54. The fluid that flows into stem passageway 54 becomes divided. A part of it travels out through the effluent conduit 110 and leaves the system. The remainder of the flow is pumped by re-circulation pump 34 through conduit 112, then through the pump 34, and then back to the ejector 122 where the cycle is repeated. New gas is added to the re-circulated fluid in the ejector 122 and new untreated liquid is added to the fluid stream in the Tee fitting 130.

FIGS. 10 and 11 show a modified construction of the base housing 180. It may be formed from a single block of material having an upper portion 182 and a lower portion 184. The lower portion 184 is shown to be sculptured so that it includes only enough material to form an outlet conduit 186. As in the earlier embodiment, this outlet conduit includes an effluent branch 188, a re-circulation branch 190 and a stem branch 192. Effluent branch 188 is connected to an effluent conduit 110. Re-circulation branch 190 is connected to a re-circulation conduit 112. Stem branch 192 extends upwardly into the lower portion of the inner chamber 72. In this embodiment, the inlet tube 194 enters into an inner chamber that is formed inside of the upper portion 182. Preferably, it leads into one end of a helical channel that is machined into the member 182. The bottom 196 of the channel curves around the member 182 and slopes upwardly so as to give both a rotational component and an upward component a flow to fluid entering through the inlet pipe 194. As in the first embodiment, the cylindrical wall 42 of outer housing 36 connects to the member 182. The bottom wall 52 of the inner housing 38 connects to the top of the stem branch 192 and includes an opening that is in registry with the opening in the stem branch 192. There are also other ways of causing the fluid to travel in an upwardly directed helical path. The inlet tube 194 may connect to a tube inside of a housing member such as member 182 that is helical in form. A helical channel is preferred because the channel is open at its top. A helical pipe only has an end opening.

Figure 14:
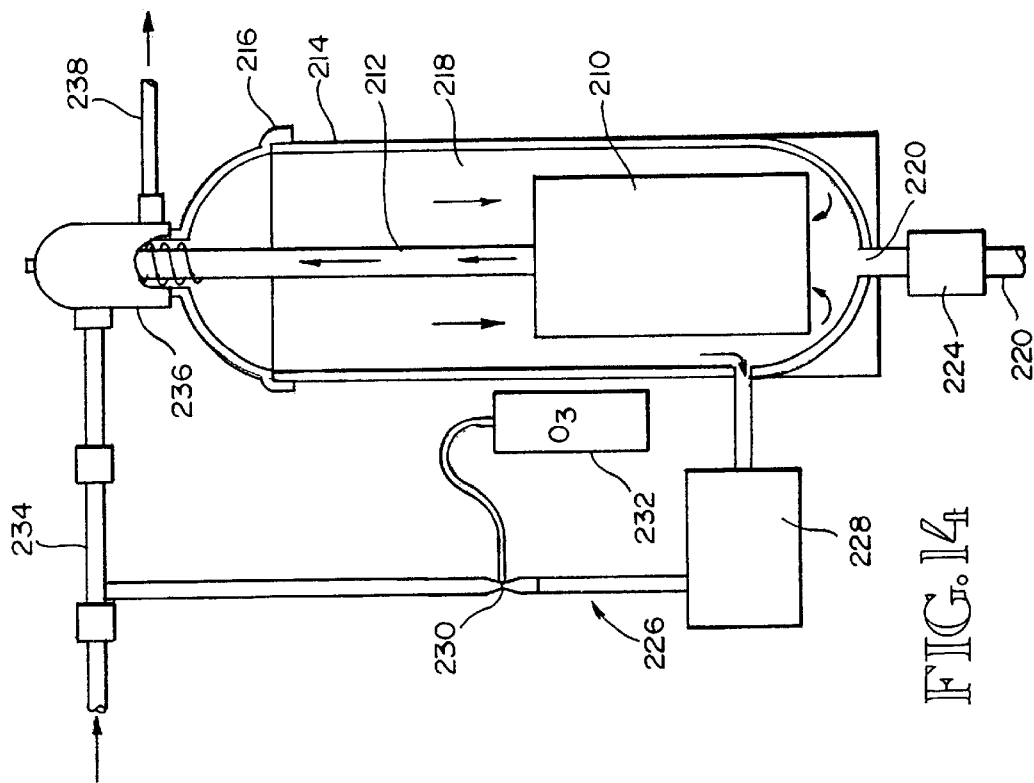
FIG. 14 is a view like FIG. 13, but showing a connection of the re-circulation conduit to the untreated water conduit that leads to the vortex chamber at the upper end of the contact tank.
Figure 13:
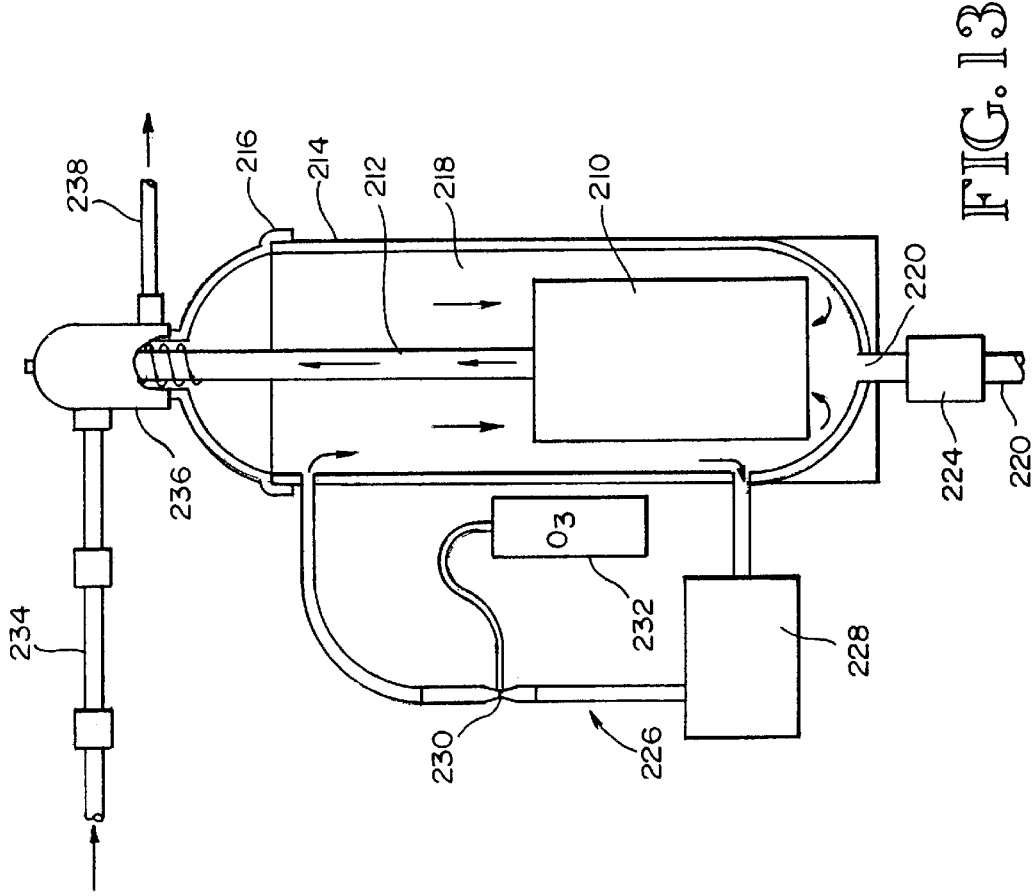
FIG. 13 is a view similar to FIG. 2 in my aforementioned U.S. Pat. No. 60,054,046, to which a charcoal filter unit has been added.

FIGS. 12–14 disclose the use of a filter in the contact tank. The contact tank shown by FIG. 12 is like the contact tank shown in the drawings and described above in this document. In this embodiment, a charcoal filter canister 200 may be fittable within the lower portion of the inner chamber 72. The filter cartridge 200 has a filter mass through which the liquid flows and a surrounding sheath or casing 202. The filter cartridge 200 is slipped into the inner chamber 72 before the upper portion 56, 62 of the outer housing 36 is installed.

FIG. 12 shows a second Tee 204 in conduit 112 between Tee 130 and the inlet pipe 46. A dump conduit 206 is connected to this Tee 204. Conduit 206 includes a solenoid operated on/off valve 208. When it is desired to backwash the filter 200, valve 208 is opened and backwash liquid is introduced via conduit 110 into the passageway 44. This causes the backwash liquid to flow upwardly through stem conduit 54 and into the filter cartridge 200. As this liquid flows through the filter cartridge 200, it picks up impurities and carries them with it upwardly to transfer passageway 74. The impurity laden liquid flows through passageway 74 and then falls down through passageway 70 and eventually flows out through pipe 46, into the Tee 112, and from Tee 112 into and through the dump conduit 208. After sufficient backwashing liquid has been run through the filter 200, the introduction of backwashing liquid is stopped and upon chambers 70, 72, and conduits 112, 206, 44 and 110 becoming empty, the solenoid valve 206 is closed. The equipment is then operated to treat additional untreated liquid in the manner described above.

FIGS. 13 and 14 disclosed contact tanks similar to the contact tank disclosed in my aforementioned U.S. Pat. No. 6,054,046. FIG. 13 shows a filter cartridge 210 connected to the lower end of a center tube 212. The center tube 212 and the filter cartridge 210 is within an outer housing 214. Outer housing 214 may be formed to include a detachable connection 216 between upper and lower portions of the housing 214. This connection is provided so that the filter cartridge 210 can be inserted into and removed out from the inner chamber 218. This embodiment may also be formed to include a lower end backwash opening 220 connected to a backwash pipe 222 that includes a valve 224 that may be a solenoid operated valve. This, embodiment includes a re-circulation loop 226 that includes a re-circulation pump 228, and ejector 230 and a gas source, e.g. an ozone generator 232. This system also includes an untreated water delivery conduit 234, a vortex chamber 236 and an outlet conduit 238. Except for the presence of the filter 210, and the backwash orifice 220, conduit 222 and valve 224, and the detachable connection 216, the system of FIG. 13 is like the system disclosed in my soon to issue patent based on U.S. Ser. No. 09/071,249.

FIG. 14 shows a system like the FIG. 13 system except that the re-circulation loop delivers re-circulated fluid into the untreated water conduit 234. In this respect, the handling of the fluids is similar to the handling of the fluids in the system shown in the drawings of this document and described above in connection with such drawings. A difference is that the fluid to be re-circulated is drawn out from the outer chamber 218 in the system shown by FIG. 14. In the system shown by FIGS. 1–12, of this document, the re-circulated fluid is withdrawn from the outlet conduit 44. Also, in the system of FIG. 14, the liquid being introduced is caused to flow downwardly through the outer chamber 218 and then upwardly through the center chamber or tube 212. The vortex chamber construction and the outlet construction in the system shown by FIGS. 13 and 14 are like the vortex chamber and outline instructions that are disclosed in the aforementioned soon to issue U.S. Pat. No. 6,054,046. Accordingly, they will not be described in this document. The description of these components and the re-circulation loop components in such patent are hereby incorporated herein by this specific reference.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. An apparatus for treating a liquid with a gas, comprising:
   a vertical outer housing having a sidewall, a top end wall and a bottom end wall;
   a vertical inner housing within the outer housing, said vertical inner housing having a sidewall, a bottom wall and an open top spaced downwardly from the top wall of the outer housing, wherein an outer chamber is formed by and between the sidewalls of the inner and outer housings, an inner chamber is formed within said inner housing, and a passageway leading from the outer chamber into the inner chamber is formed between the top wall of the outer housing and an upper end portion of the sidewall of the inner housing;
   a gas and liquid mixing region whereat a gas and a liquid are mixed to form a gas/liquid mixture;
   a gas/liquid inlet conduit leading from the mixing region into a lower portion of the outer chamber and adapted to introduce the gas/liquid mixture into the outer chamber as an upwardly flowing helical stream;
   an outlet conduit below the bottom wall of the inner housing;
   an outlet in the bottom wall of the inner housing, connecting the inner chamber to the outlet conduit; and
   a gas removal outlet in the inner chamber, radially inwardly of and axially below the passageway at the top of the inner housing that connects the outer chamber with the inner chamber.

2. The apparatus of claim 1, wherein the outer housing has an upper portion that includes the top end wall and at least a major portion of the sidewall of said outer housing, and a lower portion that includes the bottom end wall of said outer housing, and wherein the upper and lower portions are detachably connected together.

3. The apparatus of claim 2, wherein the lower portion of the outer housing includes an inlet chamber, and wherein the gas/liquid inlet conduit is directed to discharge at a tangent into the inlet chamber.

4. The apparatus of claim 3, wherein the lower portion of the outer housing includes the outlet conduit.

5. The apparatus of claim 2, wherein the upper portion of the outer housing includes a first, major portion of the sidewall of the outer housing, and the lower portion of the outer housing includes a second, minor portion of the sidewall of the outer housing, and wherein said outer housing includes a screw connection for detachably connecting the upper and lower portions of the sidewall of the outer housing.

6. The apparatus of claim 1, wherein the outlet conduit includes an effluent branch leading away from the apparatus and a re-circulating branch, said apparatus further including a re-circulating pump having an inlet and an outlet, a conduit connecting the re-circulating branch of the outlet conduit with the inlet of the recirculating pump, and a conduit connecting the outlet of the recirculating pump with the gas and liquid mixing region.

7. The apparatus of claim 6, comprising a new gas delivery conduit leading into the conduit that extends from the outlet of the pump to the gas and liquid mixing region, for introducing new gas into the re-circulated mixture.

8. The apparatus of claim 7, comprising an untreated water conduit leading to the gas and liquid mixing region, whereby re-circulated gas/liquid mixture, new gas and untreated water are all combined in the gas and liquid mixing region to form a gas/liquid mixture that is then delivered through the gas/liquid inlet conduit into a lower portion of the outer chamber.

9. The apparatus of claim 1, comprising an ejector that discharges into the gas and liquid mixing region, said ejector having a main flow conduit through which re-circulated gas/liquid flows and a secondary conduit through which new gas flows.

10. The apparatus of claim 9, further comprising a conduit for delivering untreated water to the gas and liquid mixing region, so that re-circulated gas/liquid mixture, new gas and untreated liquid are admixed together in the gas and liquid mixing region, to form the mixture that is delivered into the gas/liquid inlet conduit.

11. The apparatus of claim 10, wherein the outlet conduit includes an effluent branch leading away from the apparatus and a re-circulating branch, said apparatus further including a re-circulating pump having an inlet and an outlet, a conduit connecting the re-circulating branch of the outlet with the inlet of the re-circulating pump, and a conduit connecting the outlet of the re-circulating pump with the gas and liquid mixing region.

12. The apparatus of claim 11, comprising a gas delivery conduit leading into the conduit that extends from the outlet of the pump to the gas and liquid mixing region, for introducing new gas into the re-circulated mixture.

13. The apparatus of claim 12, wherein the gas/liquid mixture that is then delivered through the gas/liquid inlet conduit is delivered into a lower portion of the outer chamber.

14. The apparatus of claim 1, comprising a gas-vent housing extending downwardly from the top end wall of the outer housing into the inner chamber, and having a sidewall that is spaced radially inwardly from an upper portion of the sidewall of the inner housing and a bottom wall, and wherein said gas removal outlet includes one or more openings in the bottom wall of said gas vent housing.

15. The apparatus of claim 14, further comprising a passageway leading from said one or more openings in the bottom wall of the gas-vent housing, through said gas-vent housing, and on out to an exhaust, and wherein said gas-vent housing includes a float controlled valve in said passageway which is normally open and is closed by the float in response to liquid flowing from the inner chamber rising in gas-vent housing to such an extent that the liquid in the gas-vent housing raises the float and closes the gas-vent passageway.

16. The apparatus of claim 1, comprising a gas-vent housing above the gas removal outlet, including a gas-vent passageway through which residual gases are vented.

17. The apparatus of claim 16, wherein the gas-vent housing includes a float positioned to be contacted by liquid that might enter up into the housing from the inner chamber, by way of the gas removal outlet, said float being connected to a valve that is adapted to close the gas vent passageway in response to liquid from the inner chamber entering into the gas-vent housing to a predetermined level.

18. The apparatus of claim 1, further including a filter in the inner housing for filtering the liquid as it flows through said inner housing to the outlet and the outlet conduit.

19. The apparatus of claim 18, including a back wash conduit for leading back wash liquid into the outlet conduit and then through the outlet in the bottom wall of the inner housing, and a back wash liquid discharge conduit connected to the gas/liquid inlet conduit, said backwash conduit including a valve that is opened when a back wash is being performed.

20. An apparatus for treating a liquid with a gas, comprising:
a vertical outer housing having a sidewall, a top end wall and a bottom end wall;
a vertical inner housing within the outer housing, said vertical inner housing having a sidewall, a top end and a bottom end,
wherein an outer chamber is formed by and between the sidewalls of the inner and outer housings, an inner chamber is formed within said inner housing, and a transfer passageway is formed between the inner and outer chambers at one end of the apparatus;
a gas and liquid mixing region whereat a gas and a liquid are mixing to form a gas/liquid mixture;
a gas/liquid inlet conduit leading from the mixing region into the apparatus at the end thereof opposite the transfer passageway;
an outlet conduit at the same end of the apparatus through which the gas/liquid inlet conduit leads into said apparatus;
wherein the gas/liquid inlet conduit introduces a mixture into the outer chamber as a helical current that flows through the outer chamber to the transfer passageway and flows through the transfer passageway into the inner chamber, and then flows back through the inner chamber to an outlet conduit;
a gas removal outlet in the top end of the apparatus that receives residual gases from the inner chamber and vents them out of the apparatus; and a filter cartridge in the inner chamber through which the gas/liquid mixture flows, said filter having a filter medium which removes impurities from the gas/liquid.

21. The apparatus of claim 20, comprising a backwash conduit adapted to deliver back flow liquid through the filter medium in a direction opposite the normal flow, a backwash dump conduit connected to receive the back liquid water, and a valve in the dump conduit having open and closed positions.

22. An apparatus for treating a liquid with a gas, comprising:
a vertical outer housing having a sidewall, a top end wall and a bottom end wall;
a vertical inner housing within the outer housing, said vertical inner housing having a sidewall, a top end and a bottom end,
wherein an outer chamber is formed by and between the sidewalls of the inner and outer housings, an inner chamber is formed within said inner housing, and a transfer passageway is formed between the inner and outer chambers at one end of the apparatus;
a gas and liquid mixing region whereat a gas and a liquid are mixing to form a gas/liquid mixture;
a gas/liquid inlet conduit leading from the mixing region into the apparatus the end thereof opposite the transfer passageway;
an outlet conduit at the same end of the apparatus through which the gas/liquid inlet conduit leads into said apparatus;
wherein the gas/liquid inlet conduit introduces a mixture into the outer chamber as a helical current that flows through the outer chamber to the transfer passageway and flows through the transfer passageway into the inner chamber, and then flows back through the inner chamber to an outlet conduit;
a gas removal outlet in the top end of the apparatus that receives residual gases from the inner chamber and vents them out of the apparatus; and
a re-circulating conduit positioned to receive gas treated liquid from a downstream region of the apparatus and re-circulate it into an upstream region; and
a re-circulating pump in the re-circulating conduit positioned to pump gas treated liquid through the conduit.

23. The apparatus of claim 22, wherein the inner chamber includes a filter cartridge through which the gas/liquid mixture flows, said filter cartridge having a filter medium which removes impurities from the gas/liquid.

24. The apparatus of claim 23, comprising a backwash conduit adapted to deliver back flow liquid through the filter medium in a direction opposite the normal flow, a backwash dump conduit connected to receive the back liquid, and a valve in the dump conduit having open and closed positions.

* * * * *